July 12, 1927.
F. G. FOLBERTH
1,635,401
WINDSHIELD CLEANER MOTOR
Filed Aug. 11, 1924    2 Sheets-Sheet 1
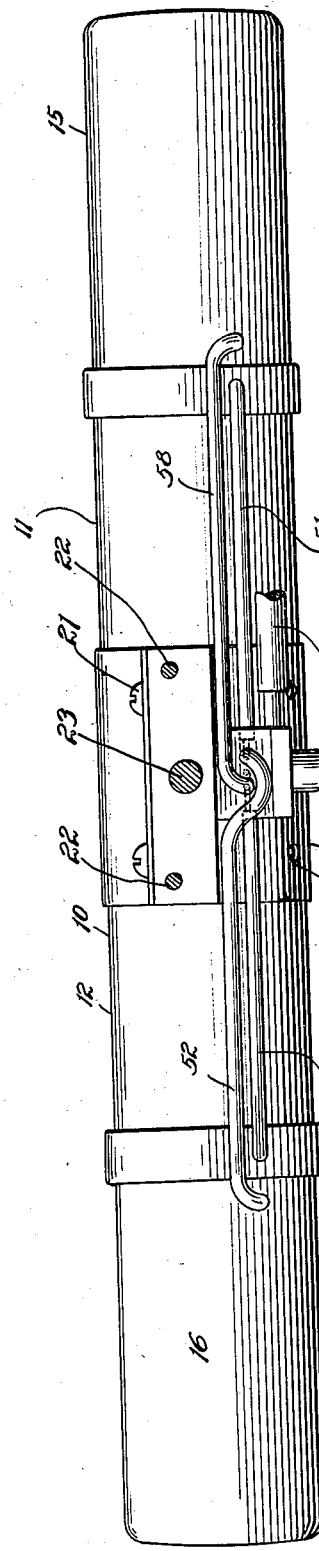
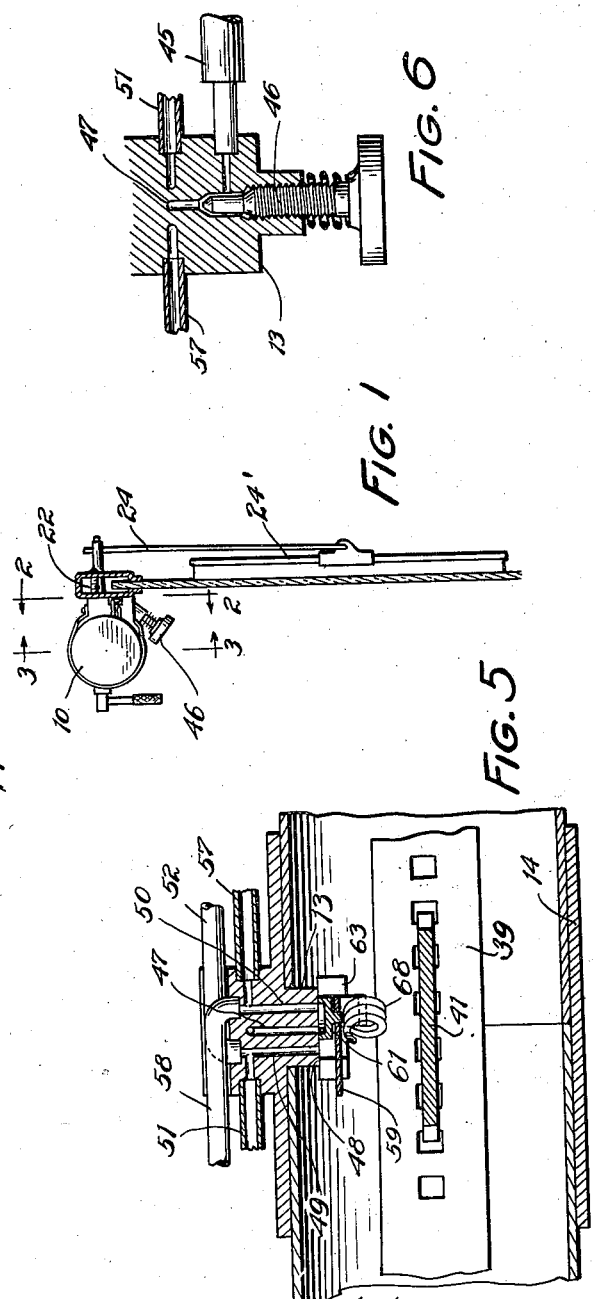
Inventor
Fred G. Folberth
Williams, Bradbury,
McCaleb & Hinkle, Attys

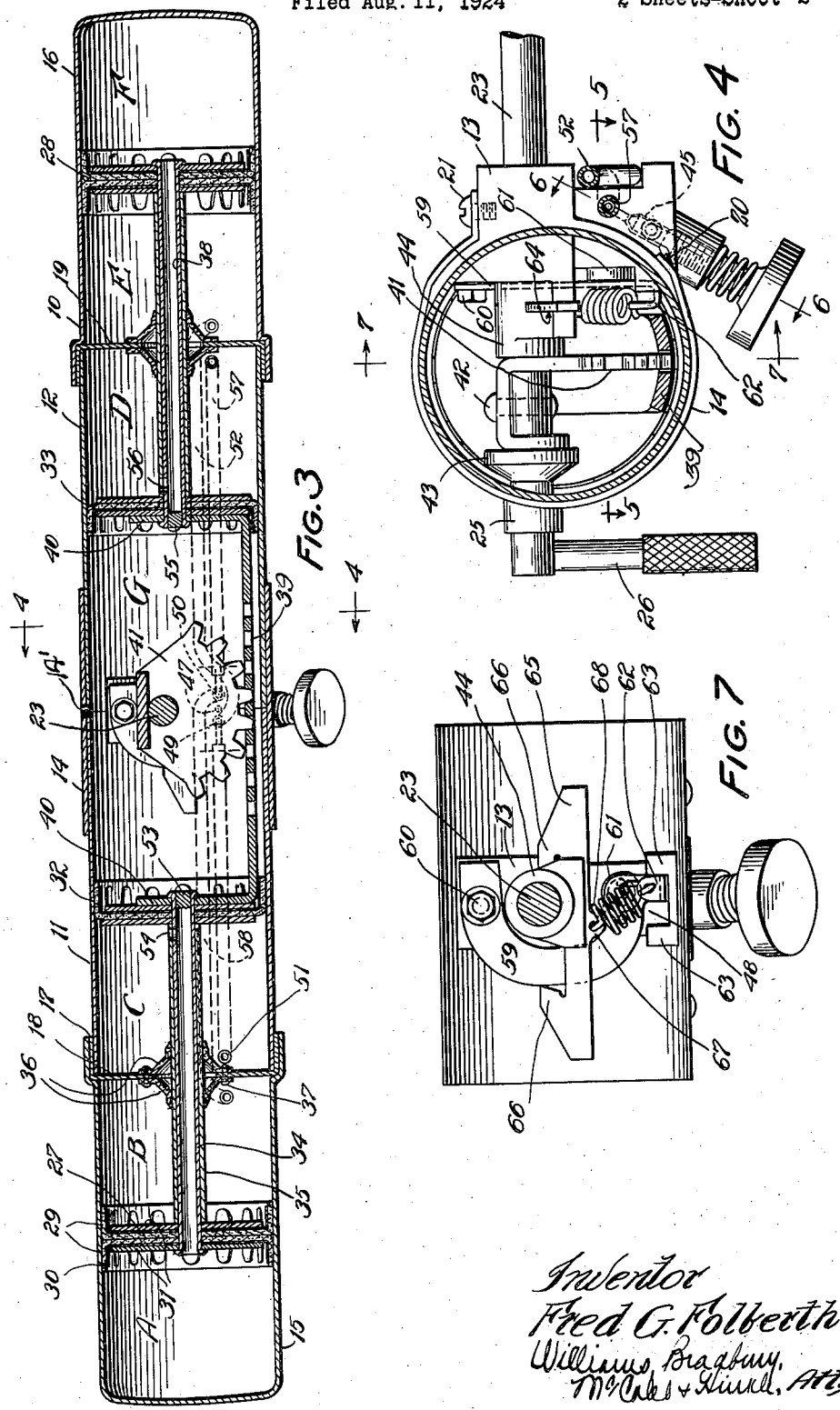

Patented July 12, 1927.

1,635,401

UNITED STATES PATENT OFFICE.

FRED G. FOLBERTH, OF CLEVELAND, OHIO, ASSIGNOR, BY MESNE ASSIGNMENTS, TO TRICO PRODUCTS CORPORATION, OF BUFFALO, NEW YORK, A CORPORATION OF NEW YORK.

WINDSHIELD-CLEANER MOTOR.

Application filed August 11, 1924. Serial No. 731,266.

My invention relates to an improved fluid pressure motor, more particularly a suction operated motor adapted to be incorporated in windshield cleaners embodying the broad principles and combinations of parts disclosed and claimed in Folberth Patent No. 1,405,773, dated February 7, 1922.

Windshield cleaners of the type disclosed in the aforementioned patent are preferably operated by the suction existing in the intake manifold of the internal combustion engine of an automotive vehicle with which the cleaner is associated. This suction varies within wide limits and often is meager in degree. It is, therefore, highly desirable that the motor of such a windshield cleaner be capable of performing its appointed task when the degree of suction available for its operation is very small. As a practical matter, it is also important that such a motor operate with a minimum of internal power losses and be of minimum height in order that when operatively mounted on a windshield or the frame thereof, it will not unduly obstruct vision through the windshield.

It was with these and other practical considerations in mind that I developed the windshield cleaner motor disclosed in the accompanying drawings, in which Figure 1 is a transverse section through the upper part of a windshield showing, in end elevation, a windshield cleaner embodying my invention attached thereto;

Figure 2 is a front elevation of the motor taken on the line 2—2 of Figure 1;

Figure 3 is a longitudinal section through the motor taken on the line 3—3 of Figure 1 and looking forwardly;

Figure 4 is a transverse section through the motor taken on the line 4—4 of Figure 3;

Figure 5 is a detail plan section of the snapover valve mechanism taken on the line 5—5 of Figure 4;

Figure 6 is a detail section, showing the shutoff valve, taken on the line 6—6 of Figure 4; and Figure 7 is a longitudinal fragmentary section taken on the line 7—7 of Figure 4, and showing the snapover valve mechanism with the cylindrical housing removed.

Briefly described, my suction motor comprises a cylindrical housing closed at both ends and preferably disposed at the rearward side of the windshield along the upper portion of the frame thereof. In each end of the housing (Fig. 3) is reciprocably mounted a pair of spaced pistons which are rigidly connected by hollow piston stems. Airtight partitions are provided toward the respective ends of the housing and intermediate the pistons of each pair, whereby are formed suction chambers A, B, C, D, E, and F, and a central atmospheric pressure compartment G. The two pairs of pistons are rigidly connected by a rack which extends across the bottom of the compartment G and is engaged by a toothed sector carried by the rock-shaft. In a typical cycle of operations, suction is applied to the suction chambers B and D and through one of the hollow piston stems to the chamber F. The other three chambers A, C and E are at this time relieved to atmospheric pressure; therefore the applied suction is effective over the area of three pistons to pull the rack to the right. When the limit of the movement to the right is reached, suitable valve mechanism relieves the chambers B, D and F to atmospheric pressure and applies suction to the chambers E and C, and through a hollow piston stem to the chamber A; whereupon the applied suction is again effective over the area of three pistons to move the rack to the left. In this way the cleaner element connected with the rock-shaft is operated in the usual manner, but with substantially thrice the power obtainable in the type of motor shown in the previously mentioned patent when the available suction and the diameter and stroke of the pistons are the same.

The cylindrical housing (hereinafter called the cylinder) is indicated at 10. It is formed in part by intermediate tubular portions 11 and 12 held in alignment and secured to a block or casting 13 by means of a wide clamping ring 14. The cylinder is completed by the end or cap portions 15 and 16, the inner ends of the said cap portions being enlarged and fitting over the outer ends of the tubular portions 11 and 12 with the cylindrical flanges 17 of the partitions 18 and 19, respectively, inserted therebetween to form a fluid tight joint. The clamping ring 14 is C-shaped, one end being caught by hook shaped lugs 20 at the lower side of the block 13, while the other end is pulled down upon the top side of the block by cap screws 21. In motor constructions of this type, the joint between the cylinders 11 and 12 and the clamping band 14 is sufficiently loose to permit atmospheric pressure to obtain in the central compartment G. However, for the purposes of illustration, a port 14' is shown passing from within through the band 14 for the ingress of air to said compartment G.

The forward side of the block 13, that is, the side which fits against the rearward side of the windshield frame, is provided with a pair of tapped holes for the reception of the cap screws 22 which pass through suitable holes in the windshield frame and serve to clamp the motor tightly against the frame. The block 13 is bored to provide a journal for the rock-shaft 23 which extends through a suitable hole in the windshield frame intermediate the cap screws 22, and carries at its free end an arm or rod 24 bearing at its end the squeegee 24'. The rearward end of the shaft 23 is journaled in a bearing formed by mating semi-cylindrical bosses struck from the juxtaposed ends of the tubular portions 11 and 12 of the cylinder, the bearing formed by these bosses being indicated at 25 (Fig. 4). An arm 26 is preferably provided at the rear end of the shaft for swinging the squeegee to one of its upper positions when the motor leaves it extending across the field of vision.

A piston 27 reciprocates in the portion 15 of the cylinder, and a similar piston 28 reciprocates in the portion 16. Each of these pistons comprises a pair of cup leathers 29 and spreaders 30 clamped between plates 31. Pistons 32 and 33 reciprocate in the tubular portions 11 and 12, respectively; these pistons being generally similar to the pistons 27 and 28, except that they have single cup leathers. The pistons 27 and 32 are rigidly connected in spaced relation by a hollow piston stem 34 and, if desired, by a spacing sleeve 35 surrounding the stem. A pair of oppositely disposed and centrally apertured leathers 36 are clamped to the partition 18 at its central opening as by rivets 37, for the purpose of sealing the previously mentioned suction chambers B and C along the piston stem. A similar arrangement of parts, comprising a piston stem 38, is utilized for connecting pistons 28 and 33 and for sealing the chambers D and E, each from the other.

The two pairs of pistons are connected by the rack 39, which is in the form of a metal stamping extending along the bottom of the central compartment G, and provided at its ends with upturned portions 40 through which the ends of the piston stems 34 and 38 extend and over which they are peened. It will thus be seen that the pistons 27, 32, 33 and 28, the piston stems 34 and 38, and the rack 39, all reciprocate as a unit. The teeth of the rack 39 are formed by punching a series of holes along the horizontal portion thereof. The rack 39 is engaged by the toothed sector 41, which in section is in the form of an inverted J, the long and short legs of which are apertured for the passage of the rock-shaft 23 to which the sector is secured by a rivet 42. The sector is held against axial movement by a collar 43 and a bearing boss 44 extending inwardly from the block 13.

Suction from the intake manifold of the engine is applied through the tubing 45, and past a manually adjustable needle valve 46, to an inlet port 47 terminating in a valve face 48 on the inner side of the block 13 and somewhat below the shaft 23. At each side of the port 47 and in horizontal alignment therewith are valve ports 49 and 50. The valve port 49 communicates with a conduit 51 extending along the forward side of the cylinder and extending through the wall thereof to communicate with the interior of the chamber C. Another conduit 52 also leads from the valve port 49 in the opposite direction along the forward side of the cylinder and passes through the wall thereof to communicate with the chamber E.

The piston stem 34, it may be explained, is closed by a plug 53 at its inner end, and is provided with an opening 54, whereby suction admitted to the chamber C is communicated through the said stem to the suction chamber A. The piston stem 38 similarly carries an end plug 55, and has an opening 56 for establishing communication between the suction chambers D and F.

The valve port 50 connects with a pair of oppositely extending conduits 57 and 58 which communicate with the suction chambers D and B, respectively. The several conduits 51, 52, 57 and 58 are preferably of small diameter brass tubing and are well soldered at the points where they penetrate the cylinder walls to make air-tight seals.

A valve arm 59 is freely pivoted to the block 13 by a cap screw 60, the arm extending around the shaft 23 and hub 44 to a point below the shaft and adjacent the ports 47, 49 and 50 where it carries a valve disc 61. The face of the valve disc 61 fits flatly against the vertical valve face 48 of the block 13, and is hollowed out centrally to leave a narrow marginal rim to engage the valve face 48. The opposite side of the valve disc carries a small cylindrical lug which fits into a circular aperture at the free end of the arm 60. The valve arm 59 has at its free end a downwardly extending U-shaped projection 62 which confines the arm to movement between two stop lugs 63 at the lower portion of the block 13. The movement allowed by these stop lugs is such that when the arm is in its alternate positions, the valve disc will connect the common suction inlet port 47 with one of the valve ports 49 or 50 while relieving the other to atmosphere. A slot 64 cut across the lower side of the boss 44 slidably supports a trip member 65, the sliding movement of which is limited by integral stop ears 66. At its lower edge the trip member 65 carries a centrally located eye 67. Between the eye 67 and a similar eye, in the short leg of the U-shaped projection 62 of the valve arm, is a helical compression spring 68.

The movement allowed the trip member 65 by the ears 66 is greater than that allowed the free end of the valve arm by the lugs 63. Therefore, when the trip member 65 has been moved to the right (Fig. 7) as far as possible, the eye 67 will have passed a dead center relation with the cap screw 60 and the eye of the U-shaped projection 62, with the result that the compression spring 68 will snap the free end of the arm 59 to the left. When the trip member 65 is again moved to the left, the compression spring 68 similarly will snap the free end of the valve arm 59 to the position shown in Figure 7. The arm 59, trip member 65, compression spring 68, and stop lugs 63, thus co-operate to form a snapover mechanism for the valve disc 61.

Because the line of thrust imparted to the U-shaped projection 62 by the compression spring 68 is slightly angular with reference to the connection of the valve arm 59 to the cap screw 60, there is a small component of force tending to hold the valve disc 61 against the face 48 of the block 13.

When in the position shown in Figure 5, the valve disc 61 establishes communication from the suction inlet port 47 through the hollowed out portion of the valve disc face, and through the valve port 50 and conduits 57 and 58 to the chambers B and D and through the stem 38 to chamber F. At this time the valve port 49 is open to the atmospheric pressure of the compartment G, which atmospheric pressure is communicated through the conduits 51 and 52 to the chambers C and E, and through the stem 34 to the chamber A. This results in the movement of all of the pistons toward the right (Fig. 3), thereby oscillating the shaft 23 and the squeegee counterclockwise. As the pistons near the end of their movement to the right, the left end of the trip member 65 is contacted by the piston 32 and is carried to the right to snap the valve disc out of registry with the port 50 and into registry with the port 49. The chambers F, D and B are thereby relieved to atmosphere, and suction is applied to the chambers A, C and E. The pistons and the rack are then moved to the left to swing the squeegee in a clockwise direction through a suitable arc, when the piston 40 will contact the right end of the trip member 65 and return the valve mechanism to its original position of Figure 7.

It is thus clear that during each movement of the pistons, suction is effectively applied to three pistons. When the rack is moving to the left (Fig. 3), for example, suction is being applied over the area of the three pistons 32, 27 and 28. When the rack is moving to the right, suction is applied over the area of the pistons 28, 33 and 27.

While I have illustrated and described but this one particular embodiment of my invention, it is to be understood that many changes may be made therein without departing from the scope and spirit of my invention.

What I claim is:

1. A windshield cleaner motor comprising a casing consisting of a central cylindrical section and cup-shaped end sections having their open ends fitting the opposite ends of the central section with an air tight joint, an air tight partition between each end section and the central section, a hollow piston rod slidably supported in each partition, a piston connected to each end of the rods, one piston operating in each end section and dividing the same into inner and outer chambers and two pistons operating in the central section and defining end chambers lying between the partitions and the respective pistons, each piston rod establishing communication between the adjacent end chamber of the central section and the outer chamber of the adjacent end section, means for connecting a source of operating pressure first to one end chamber of the central section and the inner chamber of the remote end section and then to the opposite end chamber of the central section and the inner chamber of the opposite end section, and a connecting member joining the two pistons in the central section and operatively connected to said means for operating the same.

2. A windshield motor comprising a casing consisting of a central cylindrical section and two cup-shaped end sections having their open ends telescoping the opposite ends of the central section with an air tight joint, a partition arranged at each end of the central section and secured in place by the respective end section telescoping said central section, a hollow piston rod slidably supported in each partition, a piston connected to each end of the rods, one piston operating in each end section and dividing the same into inner and outer chambers and two pistons operating in the central section and defining end chambers lying between the partitions and the respective pistons, each piston rod establishing communication between the adjacent end chamber of the central section and the outer chamber of the adjacent end section, means for connecting a source of operating pressure first to one end chamber of the central section and the inner chamber of the remote end section and then to the opposite end chamber of the central section and the inner chamber of the opposite end section, and a connecting member joining the two pistons in the central section and operatively connected to said means for operating the same.

3. A windshield cleaner motor comprising an elongated housing with closed ends, a pair of connected pistons and a partition in each end of the housing dividing each end into three chambers, the pistons of each pair being arranged on opposite sides of the respective end partitions, means operatively connecting each pair of pistons with the other pair and for delivering power therefrom, and means adapted first to apply suction to a multiplicity of said chambers and atmospheric pressure to the others of said chambers and then to reverse the application of suction and atmospheric pressure to said chambers.

4. A windshield cleaner motor comprising an elongated housing with closed ends, a pair of connected pistons and a partition in each end of the housing dividing each end into three chambers, means operatively connecting each pair of pistons with the other pair and for delivering power from said pistons, and means adapted first to apply suction to two of the chambers in one end of the housing and one chamber in the other end of the housing to move the pistons in one direction and then to apply suction to the others of said chambers to move the pistons in the opposite direction.

5. A windshield cleaner motor comprising an elongated housing with closed ends, a pair of connected pistons and a partition in each end of the housing dividing each end into three chambers, means operatively connecting each pair of pistons with the other pair and for delivering power from said pistons, each pair of pistons comprising a hollow piston rod by virtue of which the pressures in the chambers located on corresponding sides of the pistons of the pair are equalized, and means for subjecting one pair of the hollow piston rod connected chambers to suction and the companion pair to atmospheric pressure.

6. A windshield cleaner motor comprising an elongated housing with closed ends, a pair of connected pistons and a partition in each end of the housing dividing each end into three chambers, means operatively connecting each pair of connected pistons with the other pair and for delivering power from said pistons, pressure equalizing passages affording communication between the pairs of chambers located on corresponding sides of the pistons of each pair, and means for applying suction to a chamber of one pair of the communicating chambers and for applying atmospheric pressure to a chamber of the other communicating pair of chambers.

7. A windshield cleaner motor comprising an elongated housing with closed ends, a pair of connected pistons and a partition in each end of the housing dividing each end into three chambers, means operatively connecting each pair of connected pistons to the other and for delivering power from said pistons, and means adapted first to apply suction to the chambers on corresponding sides of the pistons in one end of the housing, atmospheric pressure to the chambers on the opposite sides of the pistons in the other end of the housing, atmospheric pressure to the third chamber in the first mentioned end of the housing, and suction to the third chamber in the second mentioned end of the housing.

8. A windshield cleaner motor comprising a housing and two connected pairs of pistons therein affording six faces to which suction may be operatively applied, power transmitting means arranged between the pairs of pistons and operable thereby, and means for applying suction to three of said piston faces to effect movement of the pistons in one direction and then to apply suction to the others of said piston faces to move the pistons in the opposite direction.

In witness whereof, I hereunto subscribe my name this 7th day of August, 1924.

FRED G. FOLBERTH.